US012774162B2

(12) United States Patent
Sweeney et al.

(10) Patent No.: US 12,774,162 B2
(45) Date of Patent: Oct. 27, 2026

(54) STORAGE LIBRARY SYSTEM

(71) Applicant: Microsoft Technology Licensing, LLC, Redmond, WA (US)

(72) Inventors: David Sweeney, Cambridge (GB); Andromachi Chatzieleftheriou, Cambridge (GB); Antony Ian Taylor Rowstron, Cambridge (GB); Hugh Williams, Cambridge (GB); Richard John Black, Cambridge (GB); Russell Joyce, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 341 days.

(21) Appl. No.: 18/563,535

(22) PCT Filed: May 18, 2022

(86) PCT No.: PCT/US2022/029721

§ 371 (c)(1),
(2) Date: Nov. 22, 2023

(87) PCT Pub. No.: WO2022/251008

PCT Pub. Date: Dec. 1, 2022

(65) Prior Publication Data

US 2024/0217743 A1 Jul. 4, 2024

(30) Foreign Application Priority Data

May 25, 2021 (EP) .................................... 21175799

(51) Int. Cl.
*B65G 1/04* (2006.01)
*G01S 1/08* (2006.01)

(52) U.S. Cl.
CPC .............. *B65G 1/0492* (2013.01); *G01S 1/08* (2013.01)

(58) Field of Classification Search
CPC ..... G11B 15/6835; G11B 17/225; G01S 1/08; B65G 1/0492; B65G 1/0421;
(Continued)

(56) References Cited

U.S. PATENT DOCUMENTS 6,016,291 A * 1/2000 Joos ..................... G11B 27/002 369/30.43
6,356,803 B1 3/2002 Goodman
(Continued)

FOREIGN PATENT DOCUMENTS

CN 110217309 A 9/2019
EP 1056086 A2 11/2000
(Continued)

OTHER PUBLICATIONS

Communication under rule 71(3) Received for European Application No. 21175799.2, mailed on May 16, 2024, 7 pages.
(Continued)

*Primary Examiner* — Glenn F Myers
(74) *Attorney, Agent, or Firm* — Alleman Hall LLP

(57) ABSTRACT

A storage library system comprises a plurality of slots for storing items, a plurality of rails, and a robot for interacting with said items. The robot has at least two foot arrangements each having a respective gripping mechanism for releasably engaging that foot arrangement with the rails. The robot also has a transfer mechanism for moving the robot, while a first one or more of the foot arrangements remains engaged with a first of the rails, from a first position in which one or more of the foot arrangements is in abutment with a second of the rails to a second position in which one or more of the foot arrangements is in abutment with a third of the rails. The robot also has an end-effector for interacting with the items in the slots.

20 Claims, 16 Drawing Sheets

(58) Field of Classification Search

CPC .... B65G 1/0414; B65G 1/0407; B65G 1/065; B65G 1/04; B65G 1/0428; B65G 2203/0208; B25J 9/1035; B25J 5/02; B25J 5/04; B66F 9/063; B61C 13/00; B61B 13/00; B60L 53/80; B62D 57/02; B62D 57/032

See application file for complete search history.

(56) References Cited

U.S. PATENT DOCUMENTS

| | | | | |
|---|---|---|---|---|
| 6,539,876 | B1 | 4/2003 | Campbell | |
| 6,570,734 | B2 | 5/2003 | Ostwald | |
| 6,851,909 | B2 | 2/2005 | Campbell | |
| 7,255,525 | B2 | 8/2007 | Smith | |
| 8,457,778 | B2 | 6/2013 | Starr | |
| 10,319,404 | B1 * | 6/2019 | Hasegawa ............ | B65G 1/0492 |
| 2003/0112717 | A1 | 6/2003 | Plutt et al. | |
| 2003/0113193 | A1 | 6/2003 | Ostwald et al. | |
| 2003/0123341 | A1 | 7/2003 | Ostwald | |
| 2008/0089190 | A1 | 4/2008 | Green | |
| 2008/0282275 | A1 * | 11/2008 | Zaczek ................ | G11B 17/225 |
| 2017/0101263 | A1 | 4/2017 | Schroer | |
| 2017/0194028 | A1 * | 7/2017 | Hirose ................... | G11B 23/30 |
| 2021/0009350 | A1 | 1/2021 | Cohen et al. | |

FOREIGN PATENT DOCUMENTS

| | | | |
|---|---|---|---|
| JP | S57139888 | A | 8/1982 |
| JP | S6175075 | A | 5/1986 |
| JP | H01309840 | A | 12/1989 |
| JP | 2001014761 | A | 1/2001 |

OTHER PUBLICATIONS

Decision to grant a European patent pursuant to Article 97(1) received in European Application No. 21175799.2, mailed on Aug. 16, 2024, 2 pages.

International Search Report and Written Opinion received for PCT Application No. PCT/US22/029721 Sep. 12, 2022, 12 pages.

Search Report Issued in European Patent Application No. 21175799.2, mailed on Nov. 12, 2021, 10 pages.

First Office Action Received for Chinese Application No. 202280037949.1, mailed on Mar. 13, 2026, 15 pages. (English Translation Provided).

Request for the Submission of an Opinion received for Korean Application No. 10-2023-7040459, mailed on Jun. 22, 2026, 07 Pages (English Translation Provided).

Decision to Grant Received for Japanese Application No. 2023-572958, mailed on May 27, 2026, 05 pages. (English Translation Provided).

* cited by examiner

STORAGE LIBRARY SYSTEM

TECHNICAL FIELD

The present disclosure relates to a storage library system.

BACKGROUND

A storage library system can provide high-capacity storage of items (including, but not limited to, physical media items). A storage library system comprises a plurality of slots for holding the items, and at least one robotic means of accessing the items. For example, a storage library system may comprise a plurality of rows, each row comprising tens or hundreds of slots, stacked vertically. One or more robots may be provided which can move between slots to e.g. retrieve an item from a slot, place an item in a slot, or migrate an item between two slots.

A storage library system storing physical media items may be referred to as a "data storage library system", or a "data archive". A data storage library system storing tape cartridges is commonly called a "tape library" (aka a tape silo or tape jukebox). A data storage library system storing optical discs (e.g. CDs, DVDs, etc.) is commonly called an "optical jukebox" (aka an optical disc library).

SUMMARY

According to a first aspect disclosed herein, there is provided a storage library system comprising: a plurality of slots for storing items; a plurality of rails; and a robot for interacting with said items. The robot comprises: at least one end-effector (e.g. a reader, a grabber or other actuator) for interacting with items in the slots; at least two foot arrangements; and a transfer mechanism. Each foot arrangement comprises a respective gripping mechanism for releasably engaging that foot arrangement with one of the rails. The robot also comprises a drive mechanism for moving the robot along the rails. The transfer mechanism is constructed and arranged to move the robot, while a first one or more of the foot arrangements remains engaged with a first of the rails, from a first position in which one or more of the foot arrangements is in abutment with a second of the rails to a second position in which one or more of the foot arrangements is in abutment with a third of the rails.

In the first position, the robot is able to access a first set of one or more slots (i.e. a first position of the storage library system). In the second position, the robot is able to access a second set of one or more slots (i.e. a second position of the storage library system). The second set of slots comprises at least one slot which was not accessible by the robot in the first position. Hence, transferring the robot between positions allows the robot to access more of the slots.

There may be at least one localization feature (e.g. an RFID tag or an optical, magnetic, or capacitive marking) present for allowing the robot to determine its location in the storage library system. Moving the robot from the first position to the second position may comprise one or more of: rotating the robot about the second foot out of the plane of the rails, rotating the robot about the second foot in the plane of the rails, and translating the robot in the plane of the rails. The storage library system may comprise a plurality or "swarm" of similar robots.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
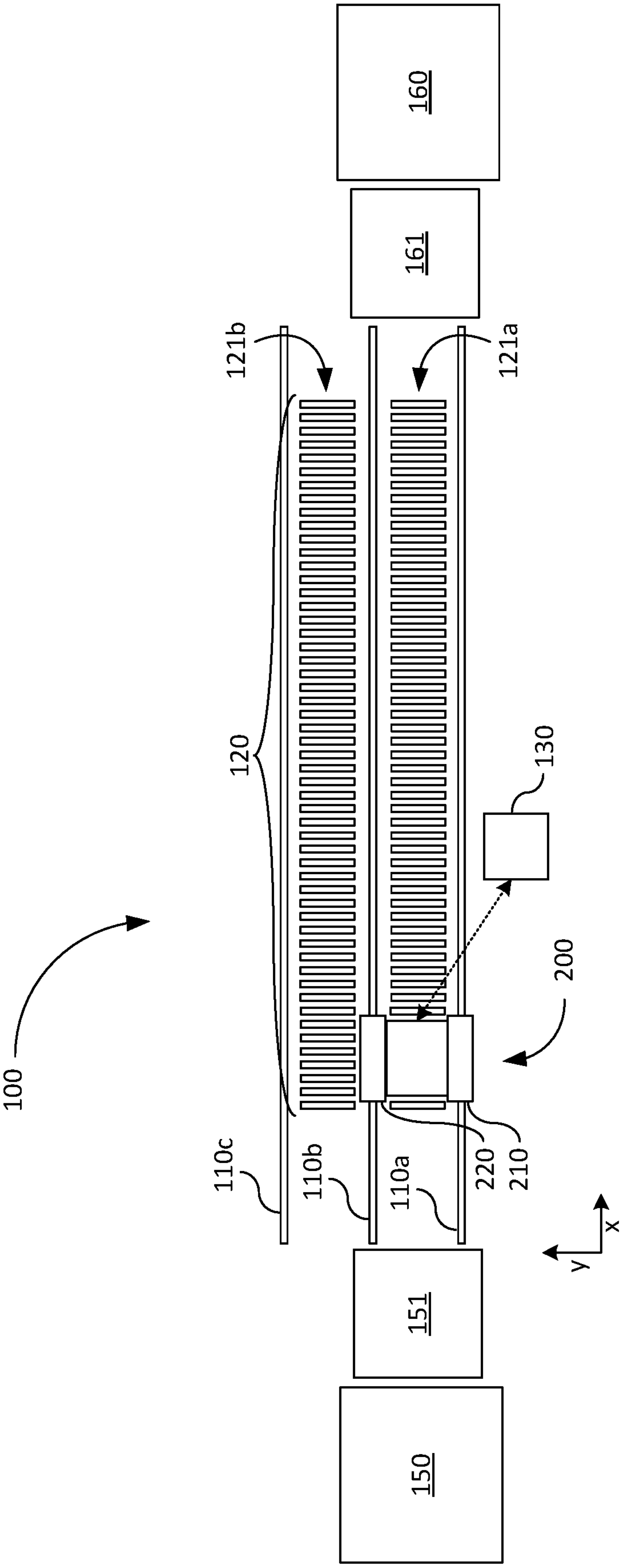
FIG. 1 shows schematically a storage library system in accordance with an example described herein.

The present disclosure relates to a storage library system (e.g. a data storage library system) having a plurality of rails on which robots can run. Each robot can move along the length of the rails to access items at different locations in the storage library system. Some, but not all locations are accessible from a given rail. As will be described in detail below, the robot comprises hardware enabling the robot itself to transfer between different rails and thereby access more locations within the storage library system. Even without performing a "complete" transfer between different rails, the same hardware still enables the robot to move relative to at least one rail (e.g. the robot might move out of the way to let another robot pass). Examples described herein provide one or more of the following advantages:

HIGHER AVAILABILITY & MINIMAL FAILURE EFFECT RADIUS—the robots aren't confined to a single pair of rails. Any failure of a robot, or a pair of rails, etc. doesn't result in failure for the remaining robots on that rail, they can move freely on & off unaffected sections, and avoid points-of-failures by overtaking failed robots/sections of rail.

DISTRIBUTED INTELLIGENCE—In some examples, the robots may be autonomous, which means that they are able to react more efficiently to the environment changing around them, adding an extra layer of safety. Onboard processing of sensors avoids the need to stream sensor data over high-bandwidth communication channels from the robots to controllers, improving reliability and enabling larger swarms.

FLEXIBLE LAYOUT & RELIABLE STORAGE—The functional elements in the storage library system (e.g. writers, readers, storage units, etc.) are unified through a network of rails which robots use to transit. There are no constraints to how these are connected to each other (different arrangements will be better suited in different situations) because the robots can transfer between rails. The modularity provides elasticity and the ability to scale up the system (e.g. to increase read/write throughput and/or the storage capacity of the system) based on the workload properties. Moreover, robots can be fetched independently. That is, the robotics may be scaled up independently from the storage, by adding more robots as needed as the workload increases.

COMPACT, LIGHT & AGILE ROBOT DESIGN—moving along a single axis rather than supporting multiple axes allows the robots to be smaller, lighter, require fewer specialised actuators and mechanics and operate using less power.

SERVICE FLEXIBILITY—During normal operation, this fact that the robots can transfer between different rails means that ANY robot can access ANY piece of media or any read/write drive in the library. This facilitates load balancing according to the workload demand. This feature also enables additional routing options, improving access to media in situations where there is elevated congestion (traditional tape library robots have only one route available between any item of media and drive i.e. via one of the few robots, a bottleneck).

HIGH PERFORMANCE—Disaggregating the functions of mounting/unmounting from picking/delivery allows for media to be prepared at a location adjacent to a drive (where congestion of robots could be an issue) and expedite the swapping of media. This maximises the utilisation of the drives and improves their efficiency. The splitting of functions also allows for designs which are specialised for their tasks, enabling high performance and high reliability.

FIG. 1 shows schematically a storage library system 100 in accordance with examples described herein. The storage library system 100 comprises a plurality of slots 120 for holding items, at least one robot 200 (also called a "shuttle"), and a plurality of rails 110. An optional central control system 130 is also shown in FIG. 1—in other examples, the functionality of the control system 130 may be implemented in a decentralized manner across a plurality of robots 200, e.g. there could also be a distributed control system, or in a fully autonomous system the robots could coordinate with each other in a distributed manner.

In operation, the robot 200 uses the rails 110 to move around the storage library system 100 to access items stored in the slots 120. Each of the rails 110 may be substantially the same in construction, allowing the robot 200 to run on any one or more of the rails 110 at a given time. The rails 110 may be parallel rails (equidistant pairs).

It will be appreciated that the exact arrangement and number of slots 120 and rails 110 can vary. In this example, the slots 120 are arranged in horizontal rows 121, with a horizontal rail 110 being located between each row 121. Specifically, a first row 121*a* of slots 120 is located between a first rail 110*a* and a second rail 110*b*, and a second row 121*b* of slots 120 is located between the second rail 110*b* and a third rail 110*c*.

For reference, a right-handed coordinate system is introduced in which the rails 110 lie in the x-y plane, with the x-axis being parallel with the rails 110 and the y-axis being perpendicular to the rails 110. The z-axis can be seen in later figures and extends away from the plane of the rails 110 (out of the page in FIG. 1). The side of the slots 120 on which the robot 200 runs may be referred to as the "front".

When at least some of the items held in the slots 120 are physical storage media, at least one write drive 150 for writing to the physical storage media and/or at least one read drive 160 for reading from the physical storage media may be provided as shown in FIG. 1.

The robot 200 may migrate a given physical storage media to a write drive 150 where that physical storage media can be written to. Specifically, when a particular media item is written to using the write drive 150, the robot 200 may migrate the media item from the write drive 150 to a slot 120 for storage.

The robot 200 may migrate a given physical storage media to the read drive 160 where that physical storage media can be read. Specifically, the robot 200 may migrate a particular media item between a slot 120 and the read drive 160 to enable the data written to that media item to be read.

In examples, there may be a plurality of write drives 150 (e.g. one per row 121) and/or a plurality of read drives 160 (e.g. one per row 121). For performance reasons, it may be preferably to locate the read drive(s) 160 close to the slots 120. In examples writing media may have looser latency requirements so it may be acceptable to have the write drive(s) 150 located further from the slots 120 than the read drive(s) 160 (e.g. remote from the storage system 100). In other examples, there may be different numbers of write drives 150 and read drives 160, e.g. there may be a read drive 160 on every row 121, but only one or two write drives 150 (e.g. located on the bottom row 121).

Figure 11:
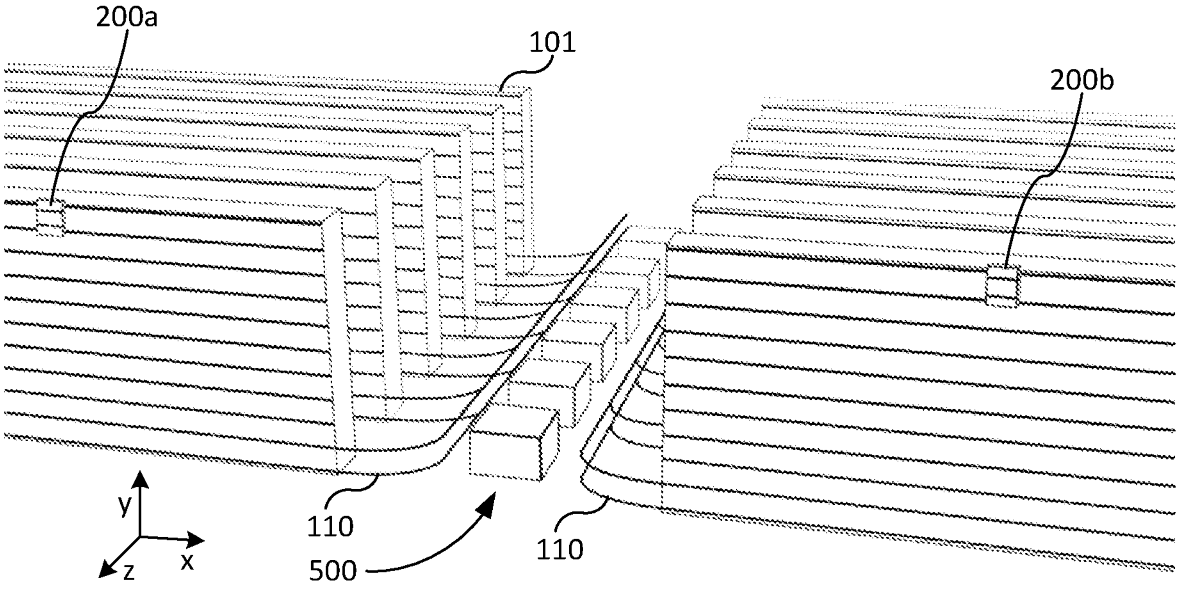
FIG. 11 shows an example arrangement of slots of a storage library system.

An example is shown in FIG. 11 discussed later below.

A write drive interface 151 may be included allowing the robot 200 to interface with the write drive 150. A read drive interface 161 may be included allowing the robot 200 to interface with the read drive 160. For example, the interfaces 151, 161 may serve as a staging area for media to be read, i.e. the robot 200 may "drop off" physical storage media at the interface 151, 161 to be added to a queue to be written/read later. This means that the robot 200 can return to the slots 120 and continue working.

In the example of FIG. 1, the write drive 150 and read drive 160 are separate units, but it is appreciated that a single drive could be provided for performing both write and read operations.

In examples, one or more of the write drive 150, read drive 160, or a single drive for performing both write and read operations may be comprised in the robot 200 itself. For example, the end-effector 240 of the robot 200 itself may comprise a write drive and/or read drive. In such examples, some or all of the migration described above is unnecessary. For example, the robot 200 may comprise an "internal" write drive 150 which means that the robot 200 itself can write to a given physical storage media and does not need to migrate it to an external write drive 150 (although it might still need to migrate it to an external read drive 160 if the robot 200 does not also include an internal read drive 160). Similarly, the robot 200 may comprise an "internal" read drive 160 which means that the robot 200 itself can read from a given physical storage media and does not need to migrate it to an external read drive 160 (although it might still need to migrate it to an external write drive 150 if the robot 200 does not also include an internal write drive 150). A robot 200 comprising both an internal write drive 150 and internal read drive 160 (or a single read-write drive) may not need to migrate the physical storage media at all (though it is not excluded because, for example, the robot 200 may still migrate physical storage media for other purposes such as maintenance).

Figure 2:
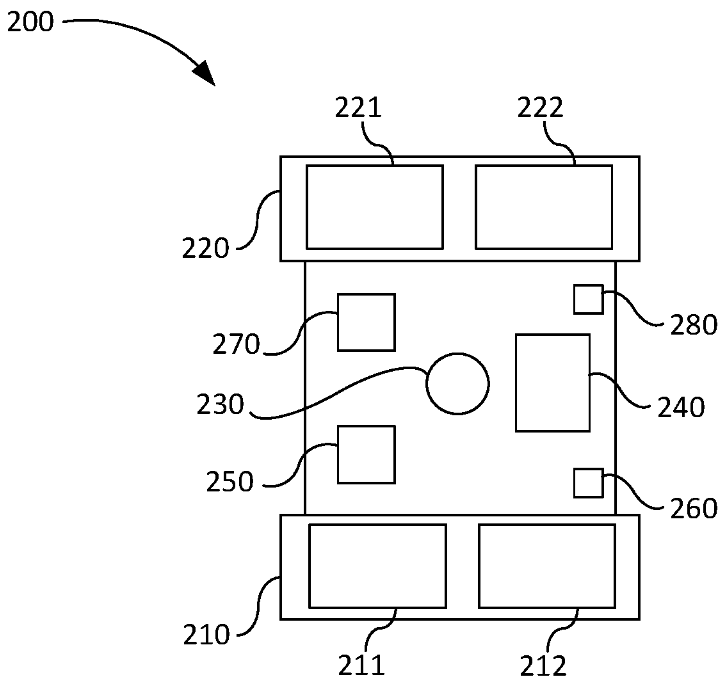
FIG. 2 shows schematically a robot in accordance with an example described herein.

A more detailed example of the robot 200 is shown in FIG. 2. The robot 200 comprises a first foot arrangement 210, a second foot arrangement 220, a transfer mechanism 230, an end-effector 240.

In this example, the robot 200 also comprises, a controller 250, a communication interface 260, a power supply 270, and a sensing system 280. These are optional features. As mentioned above, the robot 200 may also comprise one or more of a write drive 150 and a read drive 160 (or a single drive providing both write and read functionality).

The controller 250 is for controlling the first foot arrangement 210, second foot arrangement 220, transfer mechanism 230, and end-effector 240. The controller 250 may be implemented, for example, using one or more processors. In examples, the functionality of the central control system 130 shown in FIG. 1 (and described in more detail below) may instead be implemented in a distributed fashion across one or more robots 200, with each robot 200 using its internal controller 250.

The communications interface 260 allows the robot 200 to receive data from and/or send data via a communication link (illustrated with a dotted arrow in FIG. 1). In some examples, the robot 200 may receive routing information from the control system 130. In alternative or additional examples, the robot 200 may communicate with one or more other robots as part of a mesh network. Preferably, the communication link is a wireless communication link, but it is not excluded that the communication link is a wired communication link. A wireless communication link is particular advantageous when the robot 200 comprises an internal power supply 270, because then the robot 200 may be untethered from the control system 130 and can move freely throughout the library. In examples, the robot 200 may use e.g. low-friction components, regenerative braking to save power.

The power supply 270 is for powering the robot 200. In a first example, the power supply 270 may be an internal power supply of the robot 200, such as an on-board battery. An advantage of this is that the robot 200 does not require a connection to an external power supply. In other examples, the robot 200 may not comprise a power supply 270 of its own, and may instead receive power from an external power supply via a wired or wireless connection. Advantages of this include that the robot 200 does not require an on-board power supply 270 and can be made smaller and/or lighter, and that the robot 200 does not need re-charging. In a specific example, the robot 200 may receive power via the rails 110.

The sensing system 280 allows the robot 200 to determine its location within the storage library system 100. Examples of localization will be described later. The sensing system 280 for example may comprise one or more optical sensors.

The first foot arrangement 210 comprises a first gripping mechanism 211 for releasably engaging the first foot arrangement 210 with one of the rails 110. The second foot arrangement 220 comprises a second gripping mechanism 221 for releasably engaging the second foot arrangement 220 with one of the rails 110. The distance between the foot arrangements 210, 220 is substantially equal to the distance between adjacent pairs of rails 110. Hence, if the first foot arrangement 210 is engaged with one of the rails 110, the second foot arrangement 220 may engage with an adjacent one of the rails 110. The FIG. 1, for example, the first foot arrangement 210 is engaged with the first rail 110*a* and the second foot arrangement 220 is engaged with the second rail 110*b*.

Any suitable gripping mechanism may be used which can releasably engage with the rails 110.

Figure 14:
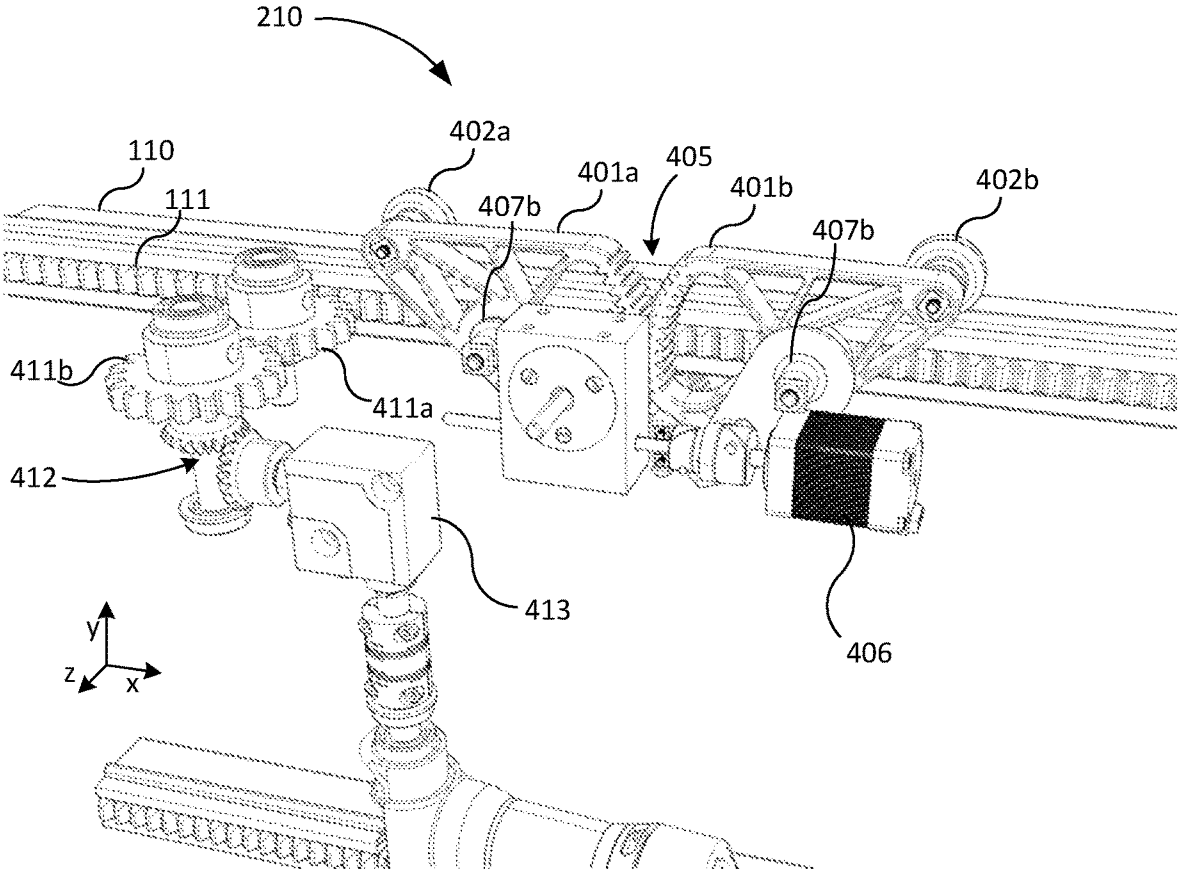
FIG. 14 shows schematically a specific example of a foot arrangement.
Figure 15A:
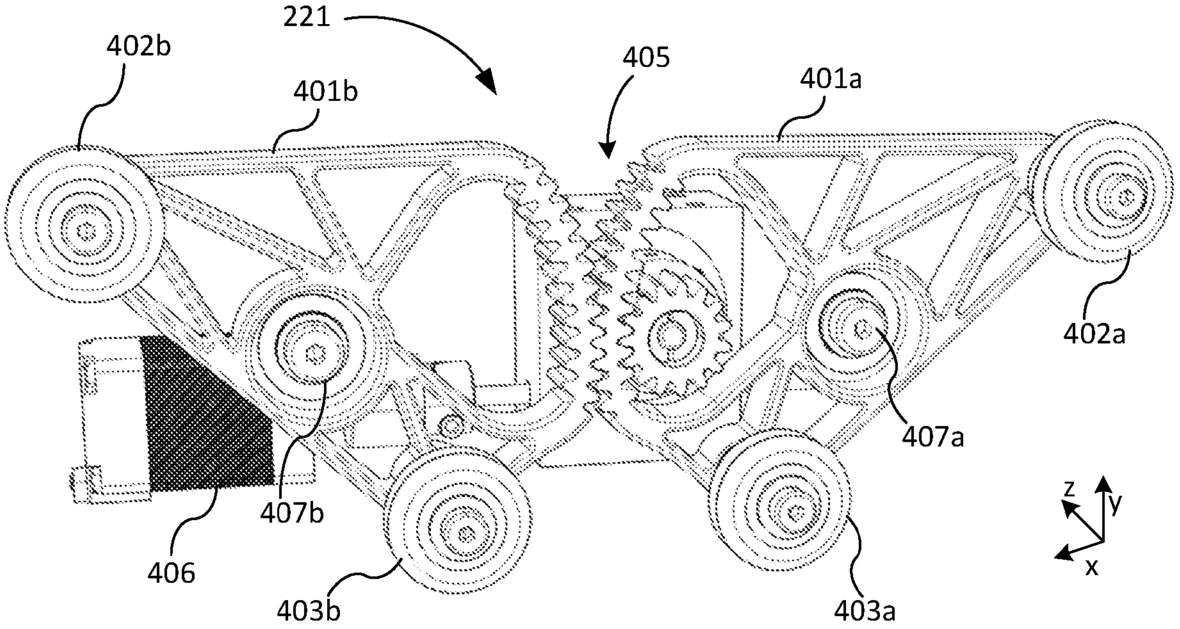
FIGS. 15*a* and 15*b* show schematically a specific example of a gripping mechanism in an open and a closed state, respectively.
Figure 15B:
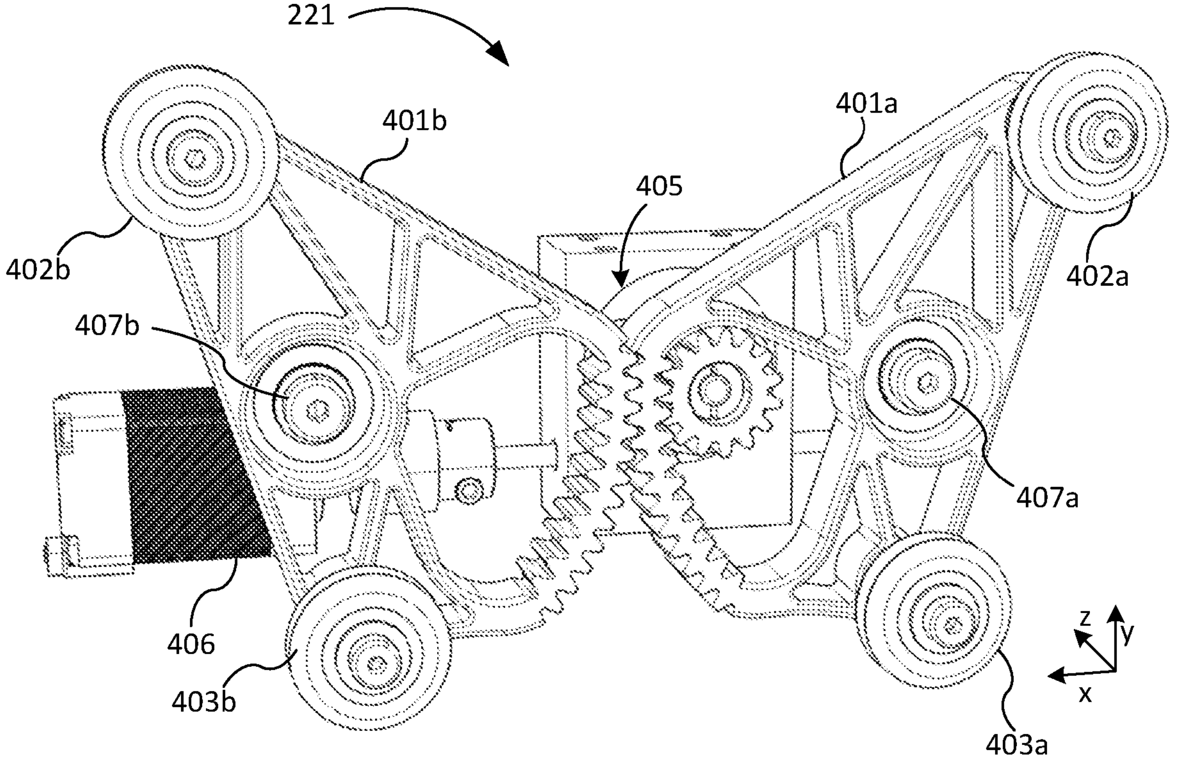

For example, one or more of the gripping mechanisms 211, 221 may be a mechanical gripping mechanism (an example is shown in FIGS. 14, 15*a*, and 15*b* described below) arranged to physically engage with the rail 110. In other examples, the rails 110 may be magnetic (i.e. ferromagnetic), and one of more of the gripping mechanisms 211, 221 may comprise at least one electromagnet for selectively engaging with the rail 110 via the electromagnetic force. In further examples, one or more of the gripping mechanisms 211, 221 may comprise both mechanical and electromechanical means for gripping the rails 110. In yet further examples, another method is to use an air bearing, and shoot pressurised air through the bearing for a low friction cushion. A mechanical gripper may still be used to envelope the rail, with the air pressure providing a bearing solution. It is also noted that permanent magnets may be used to engage a foot arrangement with a rail 110. These permanent magnets may be selectively engaged by mechanically moving the magnets closer to the rail 110.

The gripping mechanism 211 of the first foot arrangement 210 and the gripping mechanism 221 of the second foot arrangement 220 do not need to be the same type.

The robot 200 also comprises at least one drive mechanism for propelling the robot 200 along the length of the rails 110. In some examples, the drive mechanism is be located within the main body of the robot 200 (rather than one or more of the foot arrangements). For example, the drive mechanism could be a propeller mounted on the main body that pushes the robot 200 along the rails.

In alternative or additional examples, at least one of the first foot arrangement 210 and second foot arrangement 220 comprises a drive mechanism for propelling the robot 200 along the length of the rail 110 with which that foot arrangement is currently engaged. In the example of FIG. 2, the first foot arrangement 210 and second foot arrangement 220 are substantially the same in construction, with the first foot arrangement 210 comprising a first drive mechanism 212 and the second foot arrangement 220 comprising a second drive mechanism 222

In an example, the drive mechanism may comprise a wheel with a high-friction surface for interacting with the rails 110. In another example, the drive mechanism may comprise a circular gear (either straight or helical) and the rails 110 comprise a linear gear with which the circular gear of the drive mechanism can engage.

In other examples, a single mechanism may provide the gripping mechanism 211 and the drive mechanism in one or more foot arrangements. For example, the rail 110 could be constructed of alternating permanent magnetic poles, and the single mechanism may comprise a plurality of electromagnets which can be selectively controlled to both engage the foot arrangement with and propel the foot arrangement along the rail 110 (in a similar manner to a stepper motor. An advantage of this is that the gripper and the rail drive (drive mechanism) is the same part, which could reduce the robot complexity and part count/cost. This sort of set up could also be reversed, with the robot comprising an array of permanent magnets and the rails comprising a plurality of electromagnets which are selectively controlled.

The end-effector 240 allows the robot 200 to interact with the items in the slots 120. The end-effector 240 may comprise one or more of: a grabber for removing items from and/or placing items into the slots 120; a reader for reading data from items in the slots 120; and a writer for writing data to items in the slots 120. To give the robot 200 a more stable base from which to interact with the items in the slots 120, it may be preferable to activate the end-effector 240 only when both foot arrangements 210, 220 are engaged with rails 110, but this is not essential.

The specific type of end-effector 240 depends on the type of items held in the slots 120. Examples of such items include physical storage media (e.g. made of laser-written silica glass, tapes or other optical media), or non-storage computing resources such as optical computation units, etc.

Another example of an end-effector 240 is a cleaning or maintenance apparatus. For example, a robot 200 having such a cleaning apparatus may roam the storage library system 100 to clean or otherwise maintain items in the slots 120. another example of an end-effector 240 is a camera. The robot 200 may send pictures of the items in the slots 120 and/or damage to parts of the storage library system 100 to another device (e.g. central control system 130) via the communications interface 260.

The robot 200 may comprise two or more end-effectors of the same or different types.

In some examples, the storage library system 100 comprises at least one robot 200 having an end-effector 240 of a first type, and at least one robot 200 having an end-effector 240 of a second type.

This is particularly advantageous in the context of the present disclosure, where each robot 200 can transfer between rails 110, because each of the robots 200 can access overlapping portion so the storage library system 100. For example, one robot 200 might be a maintenance robot having a maintenance apparatus, and another robot 200 might be a read/write robot which accesses the items in the slots 120.

The transfer mechanism 230 allows the robot 200 to perform a transfer action (also called a rail-switching action) between the rails 110. Various specific types of transfer action are possible, which can depend on the particular construction of the robot 200, number of foot arrangements, arrangement of the rails 110, etc. Put generally, the transfer mechanism 230 is constructed and arranged to move the robot 200, while a first one or more of the foot arrangements remains engaged with a first of the rails, from a first position in which one or more of the foot arrangements is in abutment with a second of the rails to a second position in which one or more of the foot arrangements is in abutment with a third of the rails. In other words, the robot 200 may keep one or more of the foot arrangements engaged with one of the rails and use those one or more foot arrangements as an anchor to transfer between rails 110. The controller 250 may control the robot 200 to perform the transfer action.

Figure 3:
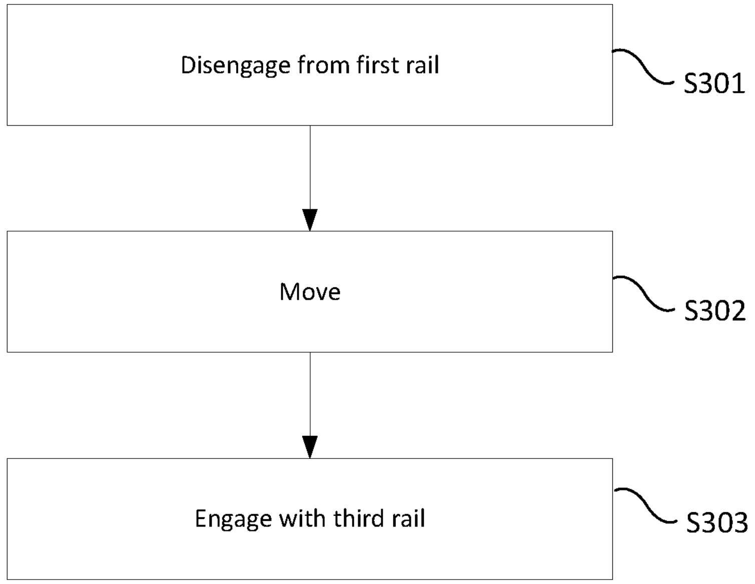
FIG. 3 shows a flow chart illustrating a transfer action performable by the robot.
Figure 4:
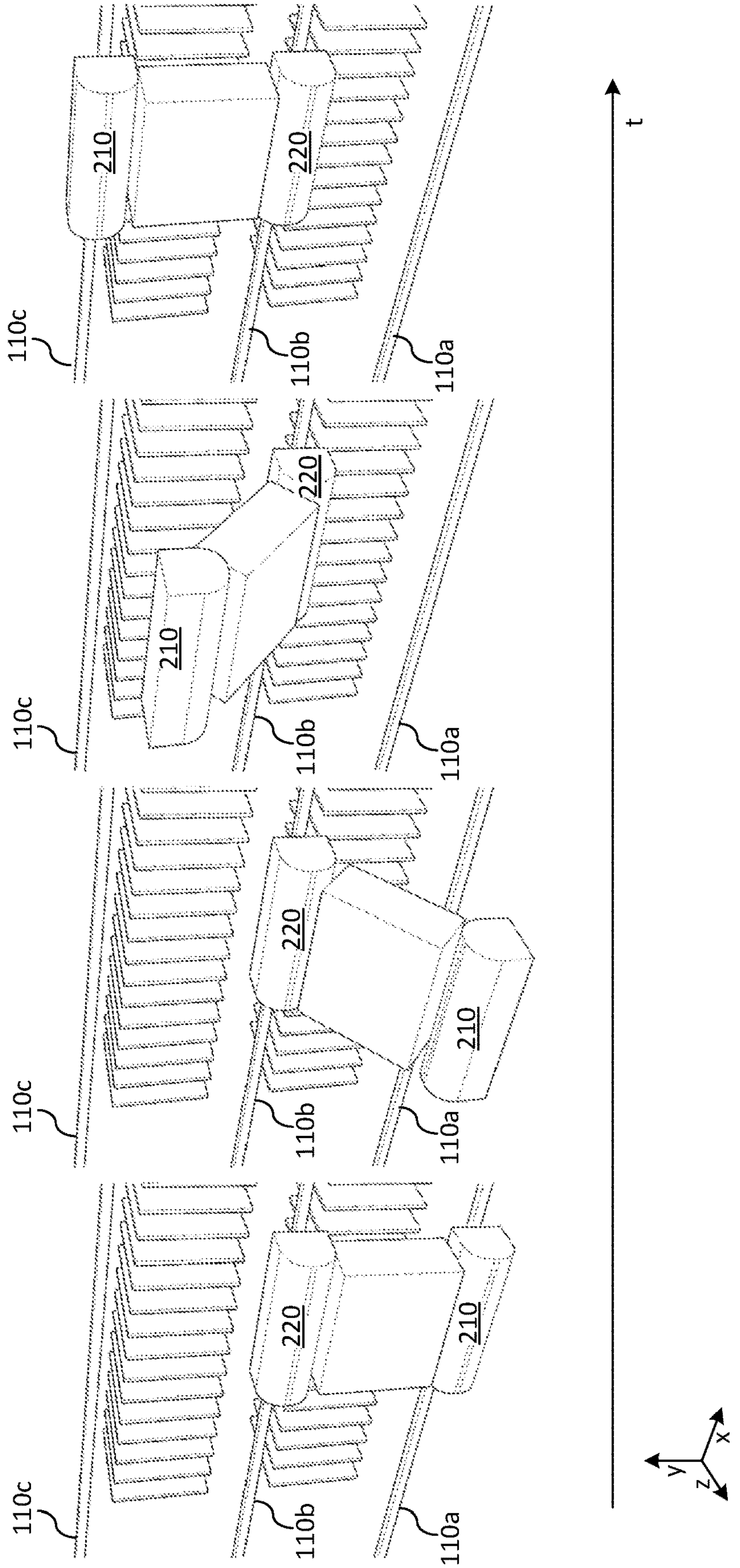
FIG. 4 shows schematically an example of a transfer action performable by the robot.

FIG. 3 is a flow chart showing an example of the transfer action. FIG. 4 shows a series of images of this example transfer action being performed by the robot 200. In this example, the robot 200 comprises two foot arrangements (as in the example of FIG. 2). Initially, the robot 200 is in a first position in which the first foot arrangement 210 is engaged with the first rail 110*a* and the second foot arrangement 220 is engaged with the second rail 110*b*. The transfer action then proceeds as follow:

At S301, the controller 250 controls the first gripping mechanism 211 to disengage the first foot arrangement 210 from the first rail 110*a*. The first foot arrangement 210 may then remain in abutment with the first rail 110*a* (though it is no longer engaged with the first rail 110*a*).

At S302, the controller 250 controls the transfer mechanism 230 to move the robot 200, while the second foot arrangement 220 is engaged with the second rail 110*b*, such that the first foot arrangement 210 moves from being in abutment with the first rail 110*a* to being in abutment with the third rail 110*c*. In this example, moving S302 the robot 200 comprises rotating the robot 200 out of the plane of the rails 110 (the x-y plane) about the second foot arrangement 220.

Specifically, the robot 200 is pivoted substantially 180 degrees around the second foot arrangement 220 with the second rail 110*b* being the axis of rotation. In other words, the second foot arrangement 200 (i.e. the one which remains engaged with a rail 110) is used as an anchor to move the robot 200. In this example, this movement S302 also comprises pivoting the first foot arrangement 210 (i.e. the ungripped side of the robot 200) a further 180 degrees in the same direction so it is the correct way up at the end of the pivot operation. Both these pivoting actions may be provided by the same transfer mechanism 230. An example transfer mechanism 230 for performing both these actions is described below with reference to FIG. 14.

At S303, the controller 250 controls the first gripping mechanism 211 to engage the first foot arrangement 210 with the third rail 110*c*. This completes the transfer action.

It is appreciated that the motion shown in FIG. 4 is only an example and that other motions are possible to move the robot 200 from the first position to the second position.

Figure 7:
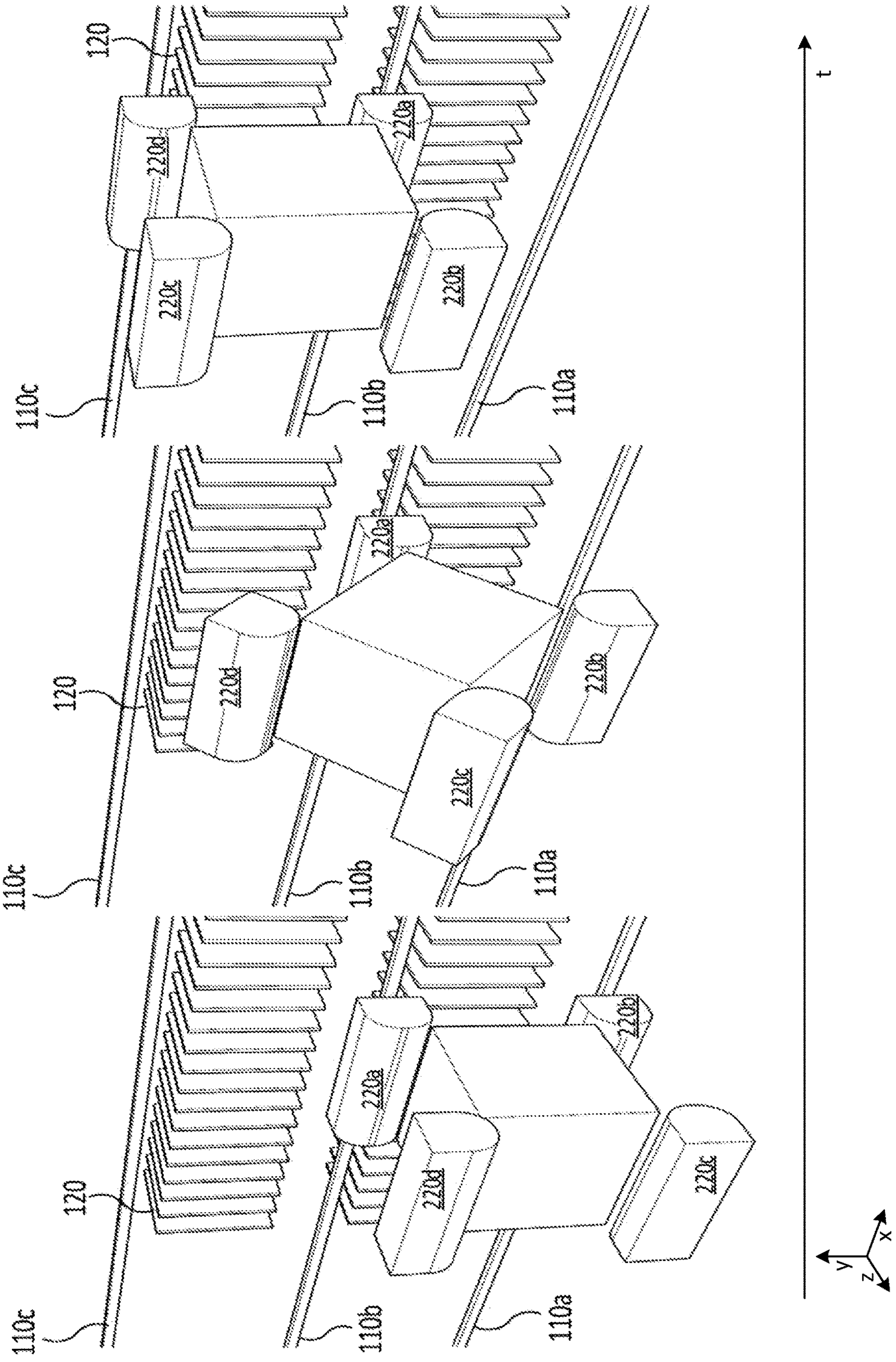
FIG. 7 shows schematically another example of a transfer action performable by the robot.

FIG. 7 shows an example of a transfer action performed by a robot 200 having four foot arrangements 220*a*, 220*b*, 220*c*, 220*d*. The robot 200 in this example has a substantially square cross-section (in the y-z plane). The foot arrangements 220*a*, 220*b*, 220*c*, 220*d* are arranged on the x-direction edges of the body of the robot 200. Like the example of FIGS. 3 and 4, moving the robot 200 comprises rotating the robot 200 out of the plane of the rails 110 (the x-y plane) about the foot arrangement which remains anchored to one rail (foot arrangement 220*a* in this case). Note that in this example, the foot arrangement 220*d* which is brought into (new) abutment with a rail (the third rail 110*c* in this example) is not the same foot arrangement 220*b* which was disengaged with its rail 110*a* at the start of the transfer action. Like the earlier example, the foot arrangement 220*d* may be rotated in the same direction in order to correctly align with the new rail 110*c* for engagement. Similar constructions may be used in which the robot 200 has a cross-section with a different shape. Particularly suitable shapes are regular polygons including a triangle, square (as in the example of FIG. 7), pentagon, hexagon, etc.

Figure 8:
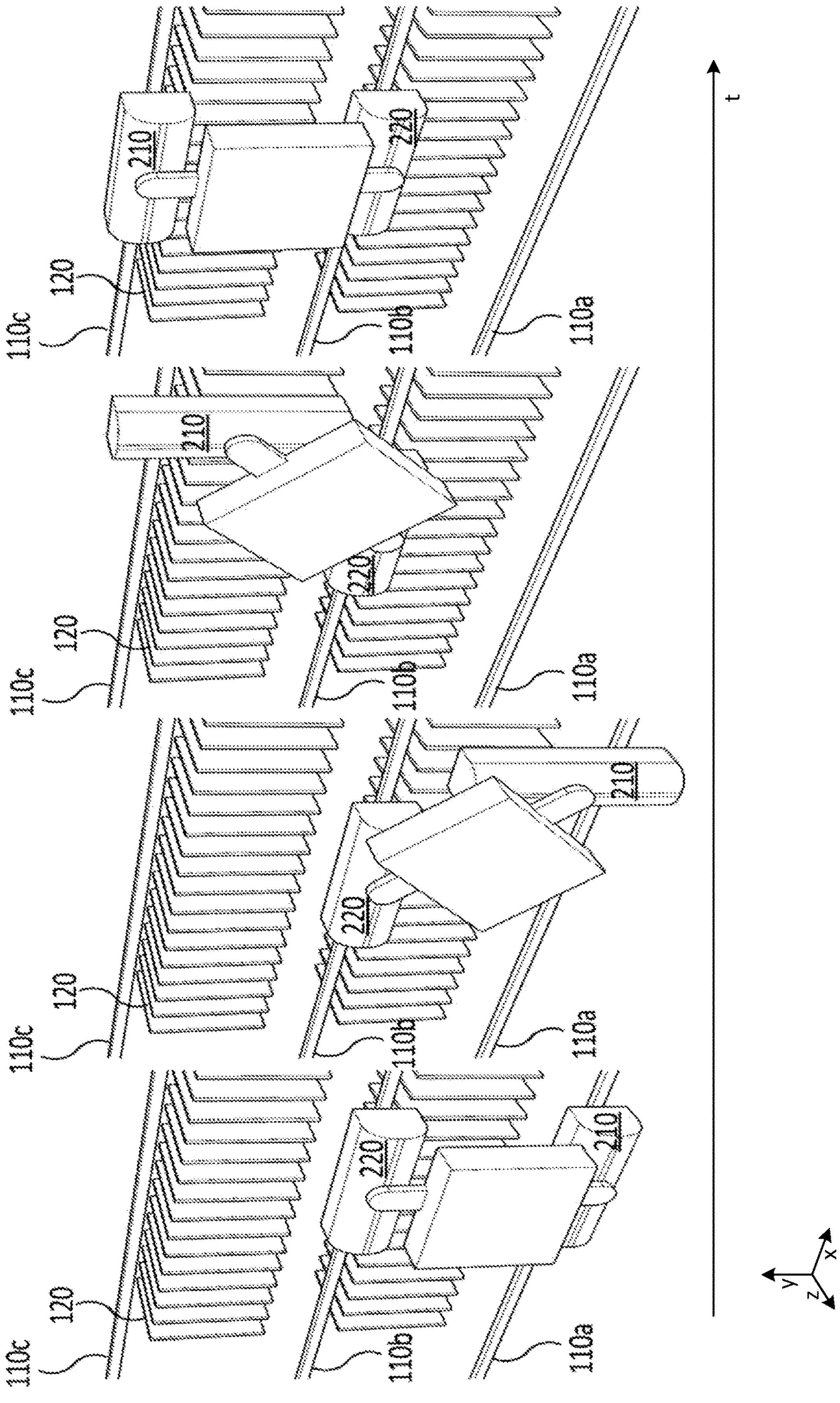
FIG. 8 shows schematically another example of a transfer action performable by the robot.

FIG. 8 shows an example of a transfer action performed by a robot 200 comprising two foot arrangements 210, 220. In this example, the transfer mechanism 230 rotates the robot 200 in the plane of the rails 110 (the x-y plane) about the engaged foot arrangement (the second foot arrangement 220 in this example). Specifically, the robot 200 is pivoted substantially 180 degrees around the second foot arrangement 220 in the x-y plane. In examples, this movement also comprises pivoting the first foot arrangement 210 (i.e. the ungripped side of the robot 200) a further 180 degrees in the same direction so it is the correct way up at the end of the pivot operation. Both these pivoting actions may be provided by the same transfer mechanism 230. In other examples, the first foot arrangement 210 may be constructed as being able to engage with a rail in either orientation, in which case it does not need to be rotated itself before engaging with the new rail.

Figure 9:
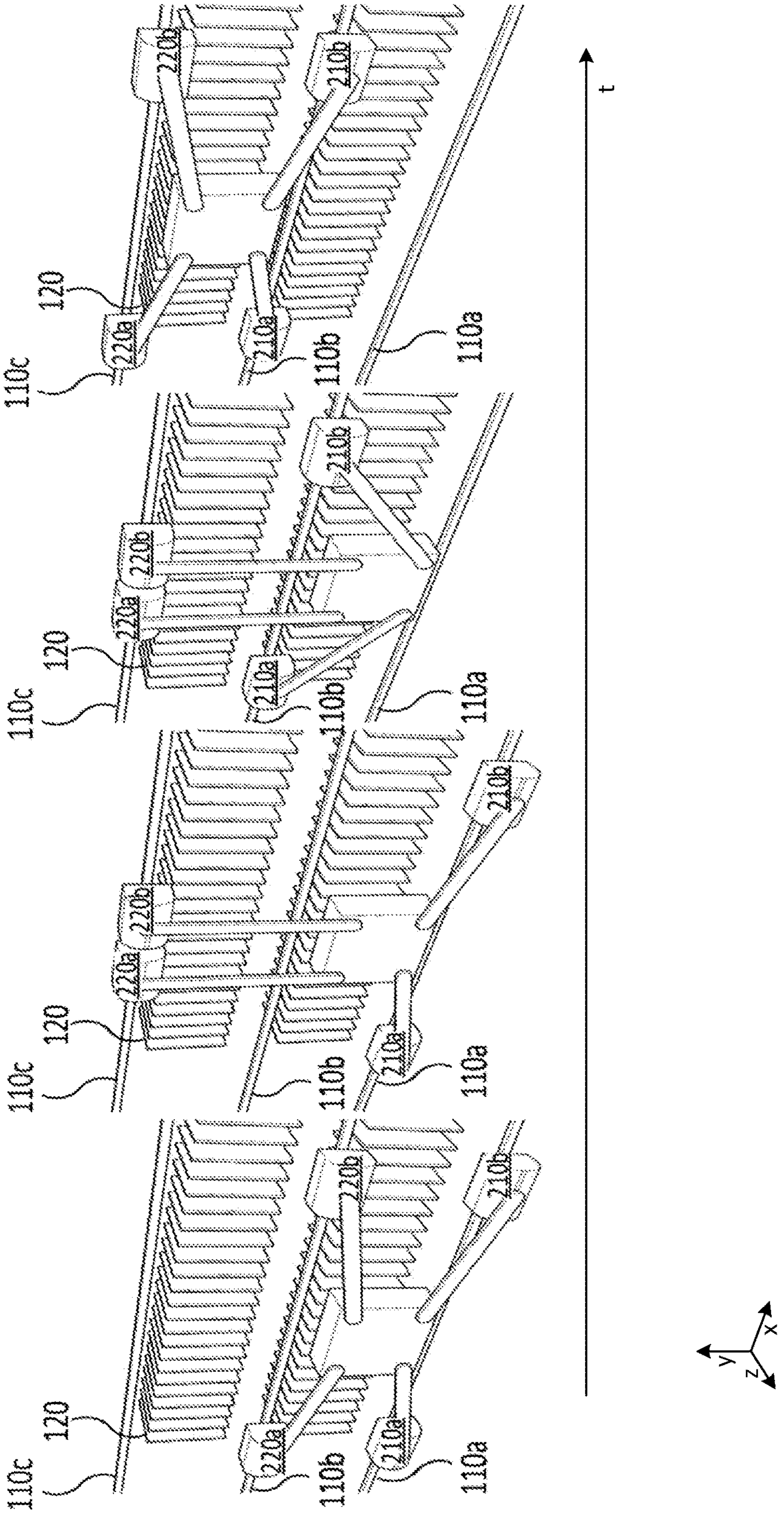
FIG. 9 shows schematically another example of a transfer action performable by the robot.

In some examples, the robot 200 may perform the transfer action in two or more stages, e.g. using a different one or more foot arrangements as the "anchor" for each stage. FIG. 9 shows such an example. In this example, the robot 200 comprises four foot arrangements: two first foot arrangements 210*a*, 210*b*, and two second foot arrangements 220*a*, 220*b*. Each foot arrangement in this example is located on the end of a "leg". In this example, the transfer mechanism 230 translates the robot 200 in the plane of the rails 110 (the x-y plane) when performing the transfer action (i.e. without rotation in either of the directions described above).

Specifically, the robot 200 begins in a position in which the (two) first foot arrangements 210*a*, 210*b* are in abutment with the first rail 110*a* and the (two) second foot arrangements 220*a*, 220*b* are engaged with the second rail 110*b*. The transfer mechanism 230 then completes a first stage by using the first foot arrangements 210*a*, 210*b* as anchors to move the second foot arrangements 220*a*, 220*b* to the third rail 110*c*. Then, the transfer mechanism 230 completes a second stage by using the second foot arrangements 220*a*, 220*b* as anchors to move the first foot arrangements 210*a*, 210*b* to the second rail 110*b*. In examples, one or more of the "legs" may have a "knee".

The ability of the robots 200 to perform the transfer action means that each robot 200 itself can move between rails 110 to access slots 120 on different rows 121. This has many advantages:

The robot 200 is independent in the sense that they can move anywhere. Additional hardware (e.g. a vertical "elevator") for moving the robot 200 between rows 121 is not required.

The robot 200 itself can retrieve items from and delivery items to slots 120 in any row 121, rather than needing to coordinate with other robots.

The number of possible routes for the robot 200 to take from its current position to the position of a target slot 120 is increased massively. This means that the robots 200 can avoid each other (see example of FIG. 6). It also means that the robots 200 can still navigate to the target slot 120 even if, for example, there is an issue with or blockage on a portion of one of the rails 110 which means the robot 200 cannot pass that particular portion. It also means that the robot 200 could potentially identify, and take, an optimal route to a target location within the library system 100.

The robot 200 can easily be removed for maintenance.

Figure 5:
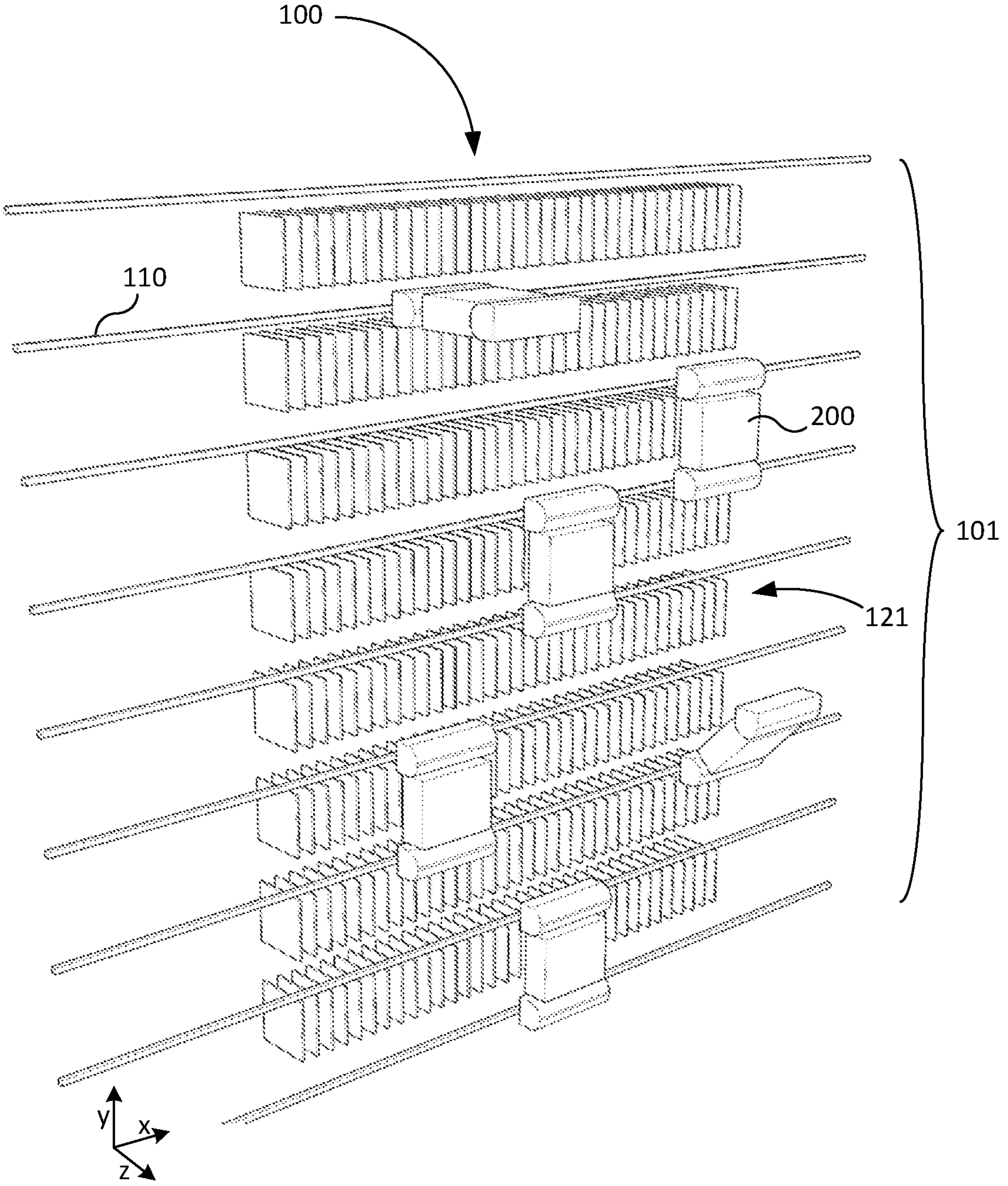
FIG. 5 shows schematically an example storage library system having a plurality of robots.

There may be a plurality, or "swarm", of identical robots 200 in the library system 100. An example is shown in FIG. 5 in which there are six robots 200 in a library system 100 comprising eight rows 121 of slots 120 and nine rails 110 (using the same alternating rail-row arrangement of FIGS. 1 and 3). In FIG. 5, a single "panel" 101 of slots 120 and rails 110 is shown. In other examples, described below, there may be more panels 101 present.

In some examples, the drive mechanism 212, 222 of one of the foot arrangements 210, 220 may activate when only that foot arrangement 210, 220 is engaged with a rail 110. That is, the robot 200 may move along a rail 110 with only a single foot arrangement 210, 220 engaged. This allows two robots 200 to pass one another using only minimal space. An example of such a passing action is illustrated in FIG. 6.

Figure 6:
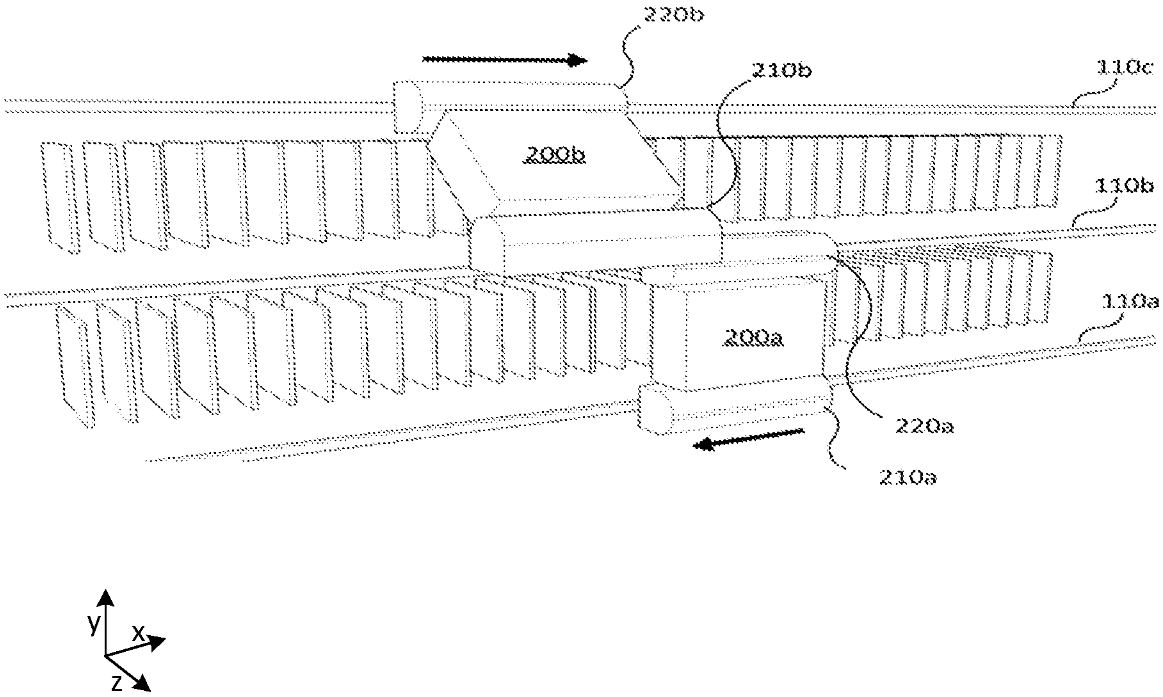
FIG. 6 shows schematically an example passing motion of two robots.

In the example of FIG. 6, there are two robots 200*a*, 200*b*. Only three rails 110*a-c* are shown for the sake of simplicity. The first robot 200*a* is in a first position in which its first foot arrangement 210*a* is engaged with the first rail 110*a* and its second foot arrangement 220*a* is engaged with the second rail 110*b*. The second robot 200*b* has its second foot arrangement 220*b* engaged with the third rail 110*c*, but the first foot arrangement 220*a* is not engaged with any rail 110. Specifically, the transfer mechanism (not shown) of the second robot 200*b* has been activated to rotate the first foot arrangement 210*b* of the second robot 200*b* out of the plane of the rails 110 and, in particular, out of the way of the first robot 200*a*. This means that the first robot 200*a* and second robot 200*b* can pass each other even though there are only three rails 110.

Figure 10A:
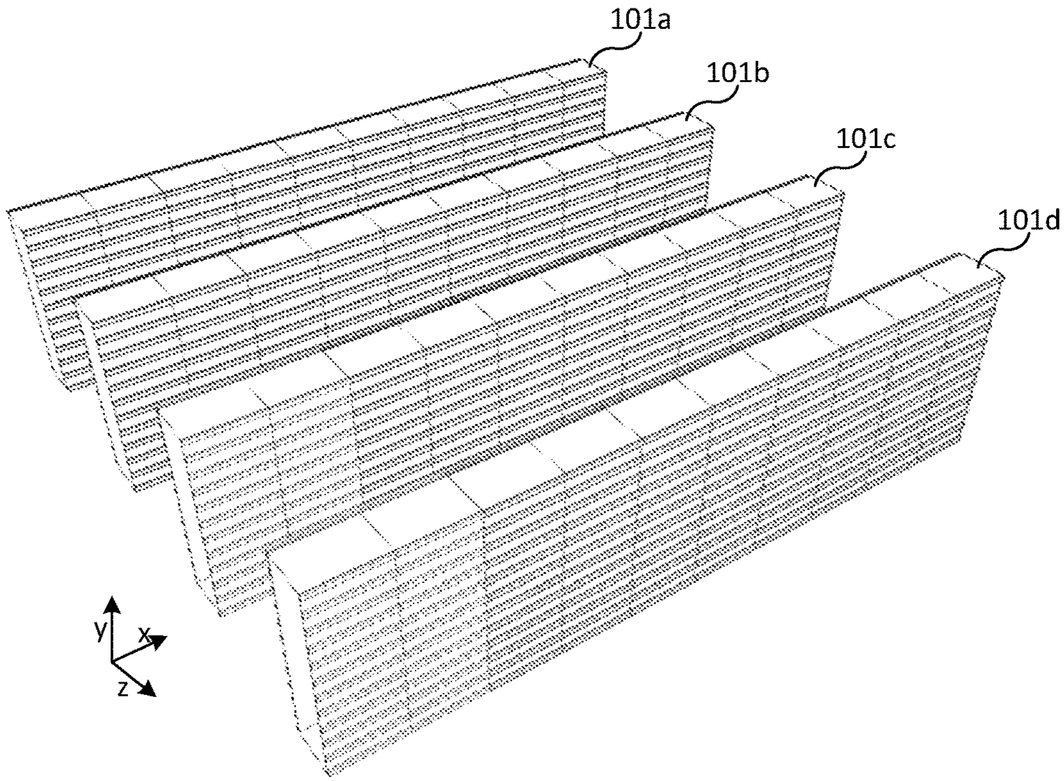
FIGS. 10*a* and 10*b* show schematically example storage library system arrangements.

Further advantages are hence realized when there is a plurality of robots 200 in the storage library system 100. For example:

- The control system 130 can dynamically allocate robotic services to where it is needed during operation. This means that the control system 130 can balance service loads and be robust to failures.
- The system is more scalable because, e.g. more robots 200 can be added in (cf. prior art where robots on same rail cannot pass each other, so limited to one or two robots per rail. More can be used, but the utility of each robot, in the prior art, decreases with each additional robot)
- Adjacent shelves can share rail hardware which can reduce library costs and simplify the storage.
- In yet further examples, the storage library system 100 may comprise a plurality of panels 101. An example is shown in FIG. 10 a in which the storage library system 100 comprises a series of four panels 101*a*, 101*b*, 101*c*, and 101*d*. Each panel 101 may have the construction as shown in the example of FIG. 5 described earlier.

In this case, the robot 200 may also use the transfer mechanism 230 to transfer between a first panel 101*a* and a second panel 101*b* adjacent the first panel 101*a*. To do so, the first foot arrangement 210 is disengaged from the first rail 110 a as before, but then the robot 200 is moved to an orientation in which the first foot arrangement 210 is in abutment with a rail on a second panel 101*b* adjacent the first, before being engaged with that rail. The transfer mechanism 230 may then move the robot 200 again to bring the second foot arrangement 220 to meet another rail of the second panel 101*b*.

Figure 10B:
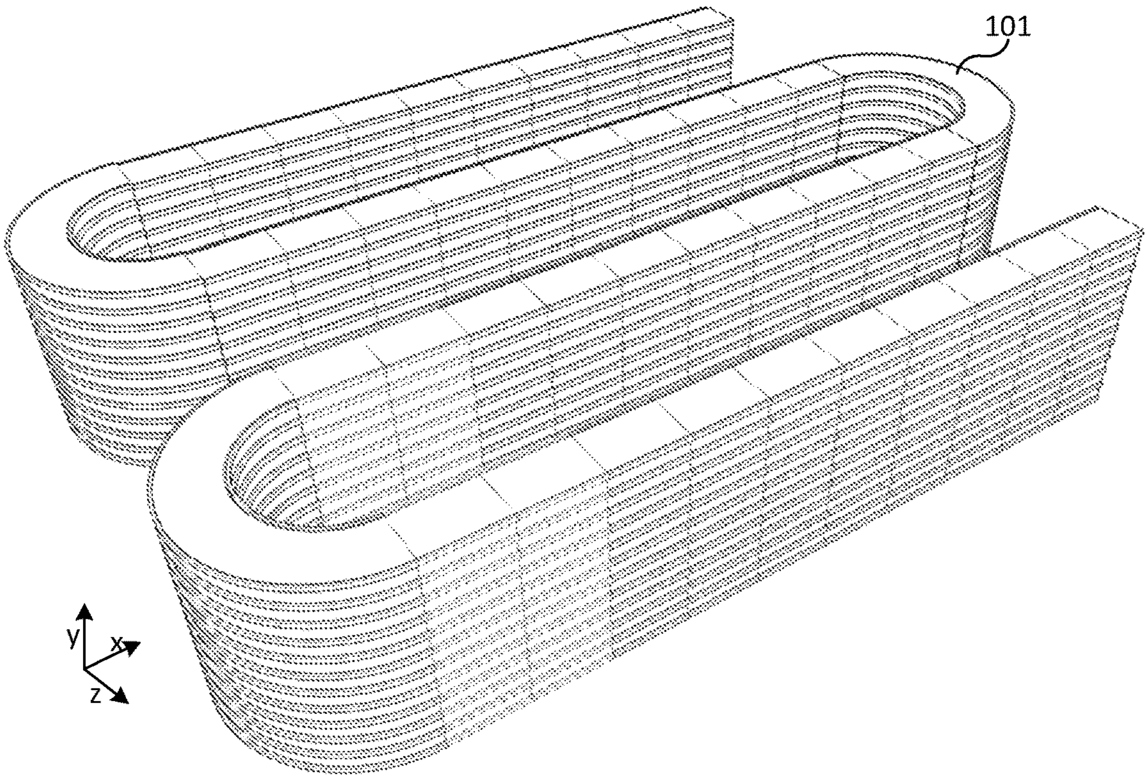

A similar arrangement can be realized with a single panel 101 having a boustrophedonic ("snaking") plan, as shown in FIG. 10*b*. This effectively elongates the horizontal dimension which the robots 200 use their primary drive system to move along (i.e. in the x direction, along the rail 110).

The example arrangement of FIG. 10*b* also allows the robot to use the transfer mechanism 230 to transfer "across" the portions of the panel (in the same manner described above for transferring between different panels 101), though it is not necessary. This type of transfer provides an alternative, and potentially faster, route to the adjacent panel portion (than the robot 200 moving along the rail 110). It can also allow the robot 200 to avoid hardware failures and/or other robots in a similar manner to described above.

FIG. 11 shows an example arrangement in which one or more drives 500 are located separately from the panels 101. The drives 500 may be, for example, one or more write drives 150 or one or more read drives 160 (as described above). At least one of the rails 110 extends from a panel 101 to the drives 500 in order to allow robots 200 to access the drives 500. Hence, another advantage of the transfer action is realized because all robots 200 can reach the drives 500 without requiring every rail 110 to be connected to the drives 500.

Figure 12:
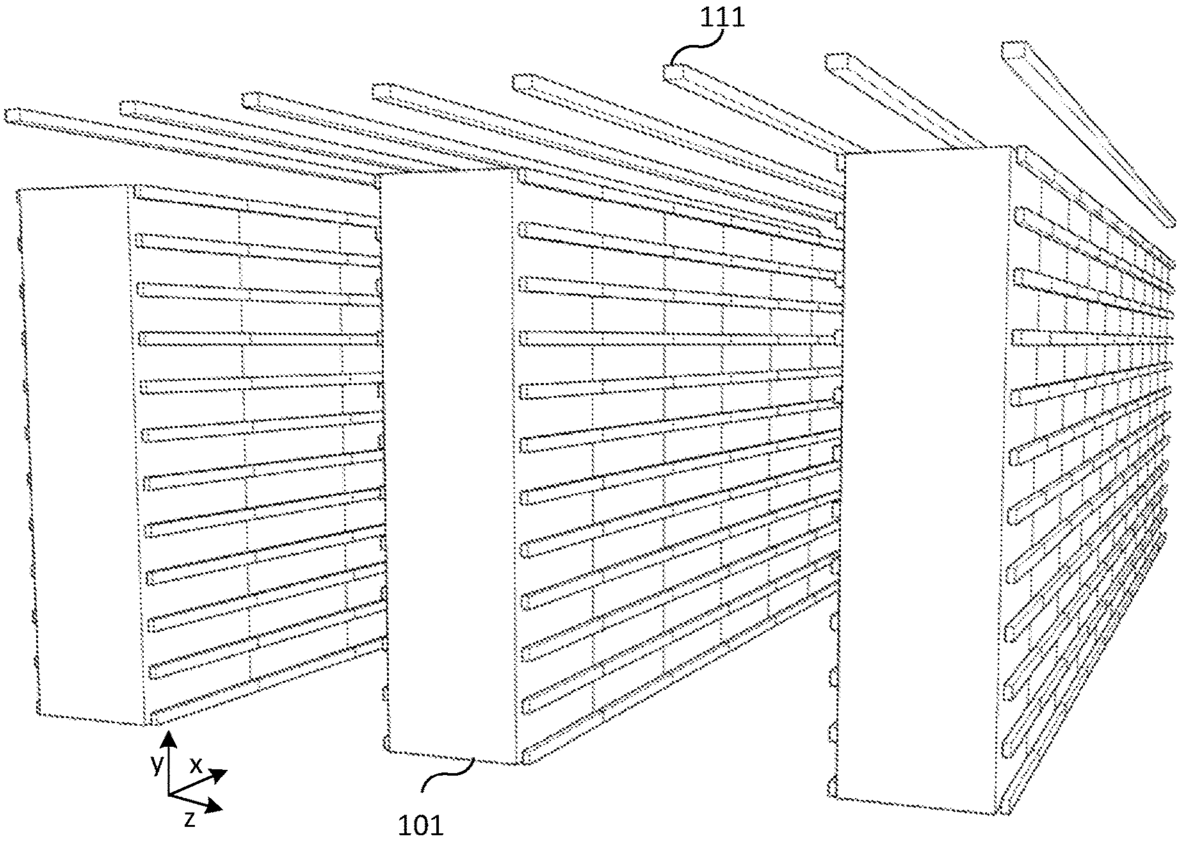
FIG. 12 shows an example arrangement of slots of a storage library system.

FIG. 12 shows an example arrangement in which there is provided at least one non-panel rail 111. These non-panel rails 111 are rails with a similar construction to the (panel-) rails 110, but their location is such that the robot 200 cannot access items in the slots 120 when engaged with one of the non-panel rails 111. In this example, the non-panel rails 111 are located above the panels 101. The robot 200 may use these non-panel rails 111 to transfer between panels 101 and/or access other parts of the storage library system 100.

The storage library system 100 may comprise at least one localization feature for allowing the robot 200 to determine its location in the storage library system 100. The sensing system 280 of the robot 200 may be used to detect the at least one localization feature and thereby enable the robot 200 to determine its location within the storage library system 100.

Figure 13:
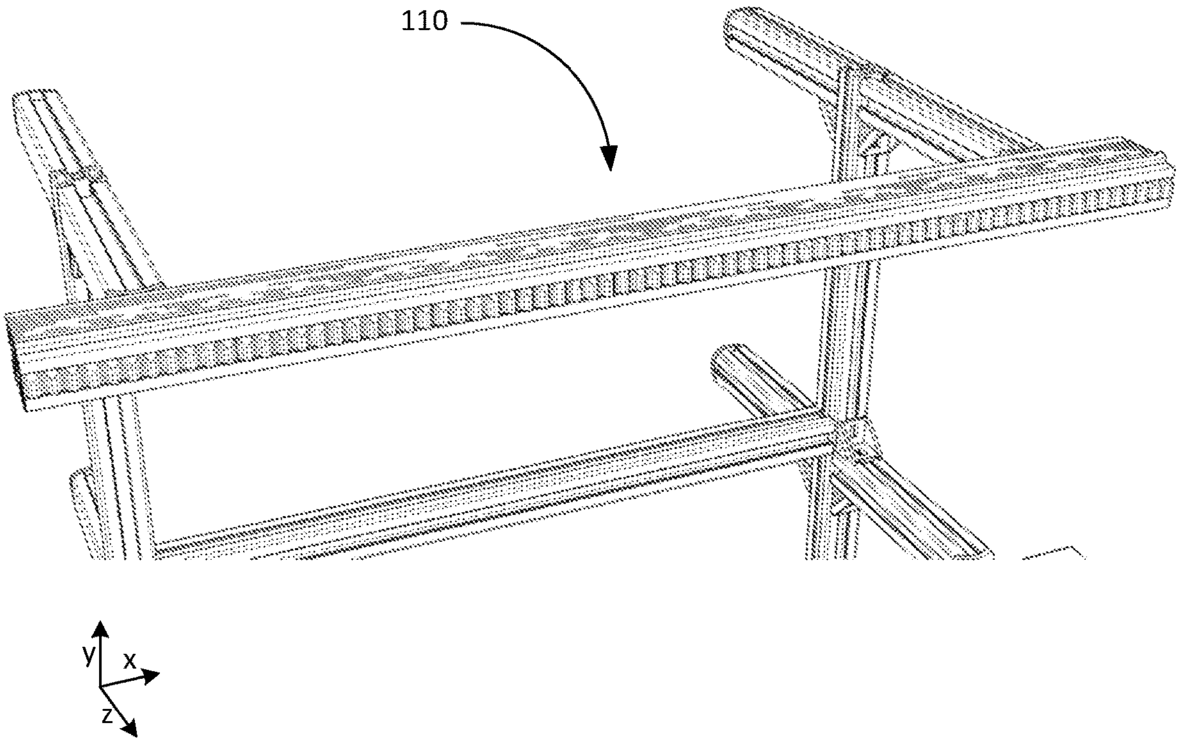
FIG. 13 shows schematically an example of a Gray code printed on one side of a rail.

A first example of a localization feature is an RFID tag located on one of the rails. A second example of a localization feature is an optical linear code (e.g. a bar code or a Gray code). An example of a Gray code is shown in FIG. 13. In some examples, each of the rails 110 comprises a respective localization feature.

In FIG. 13, a Gray code is printed on one side (the top, in this example) of a rail 110. The Gray code may be an optical Gray code, a magnetic Gray code, or a capacitive Gray code. The sensing system 280 comprises, accordingly, an optical, magnetic, or capacitive sensor. By reading the Gray code at the current location of the robot 200, the robot 200 is able to uniquely determine its location.

In an example, the robot 200 comprises an internal location module configured to determine a location of the robot 200 in the media storage library system 200. This is particularly advantageous given the fact that, as mentioned, the robot 200 is free-roaming within the storage library system 100.

A specific example construction of the robot 200 will now be described with reference to FIGS. 14-16

FIG. 14 shows an example first foot arrangement 210. The construction of the second foot arrangement 220 may be substantially the same as that of the first foot arrangement 210 and is therefore not described in detail (the construction of the second foot arrangement 220 may be a mirror-image of that of the first foot arrangement 210).

The gripping mechanism 221 of this specific example is shown in more detail in FIGS. 15*a* and 15*b* (viewed from the other side relative to FIG. 14). FIG. 15*a* shows the gripping mechanism 221 in a first (closed) state, and FIG. 15*b* shows the gripping mechanism 221 in a second (open) state.

In this example, the gripping mechanism 221 comprises a first frame 401*a* and a second frame 401*b* which pivot about a respective first pivot 407*a* and second pivot 407*b*. A gearing mechanism 405 is provided for counter-rotating the first frame 401*a* and second frame 401*b*. Each frame has one or more wheels for engaging with the rail 110 In this example, the first frame 401*a* comprises two wheels 402*a*, 403*a* and the second frame 401*b* also comprises two wheels 402*b*, 403*b*, though other arrangements are possible. Additional wheels may be provided (not shown in FIG. 14), such as wheels which run on the front of the rails 110 to provide additional stability.

A motor 406 is provided which is operable to cause the gearing mechanism 405 to move the first frame 401*a* and second frame 401*b* between a closed state and an open state, such that the wheels grab and release the sides of the rail

110. The gripping mechanism 221 is shown in a closed state in FIG. 15*a* and in an open state in FIG. 15*b*.

The foot arrangement 210 shown in FIG. 14 also comprises a drive mechanism 222 for propelling the robot 200 along the rail 110. In this example, the drive mechanism 222 comprises a first circular gear 411*a* and second circular gear 411*b*. The second circular gear 411*b* is driven by a motor 413 via a coupling link 412 (two orthogonal bevel gears in this example). The second circular gear 411*b* engages with the first circular gear 411*a* and, hence, in operation the first and second circular gears counter-rotate. In the arrangement shown in FIG. 14, the first circular gear 411*a* engages with teeth 111 of the (front side of) the rail 110. In general, the first circular gear 411*a* will engage with the teeth 111 of any rail 110 to which the gripping mechanism 221 is currently engaged.

Figure 16:
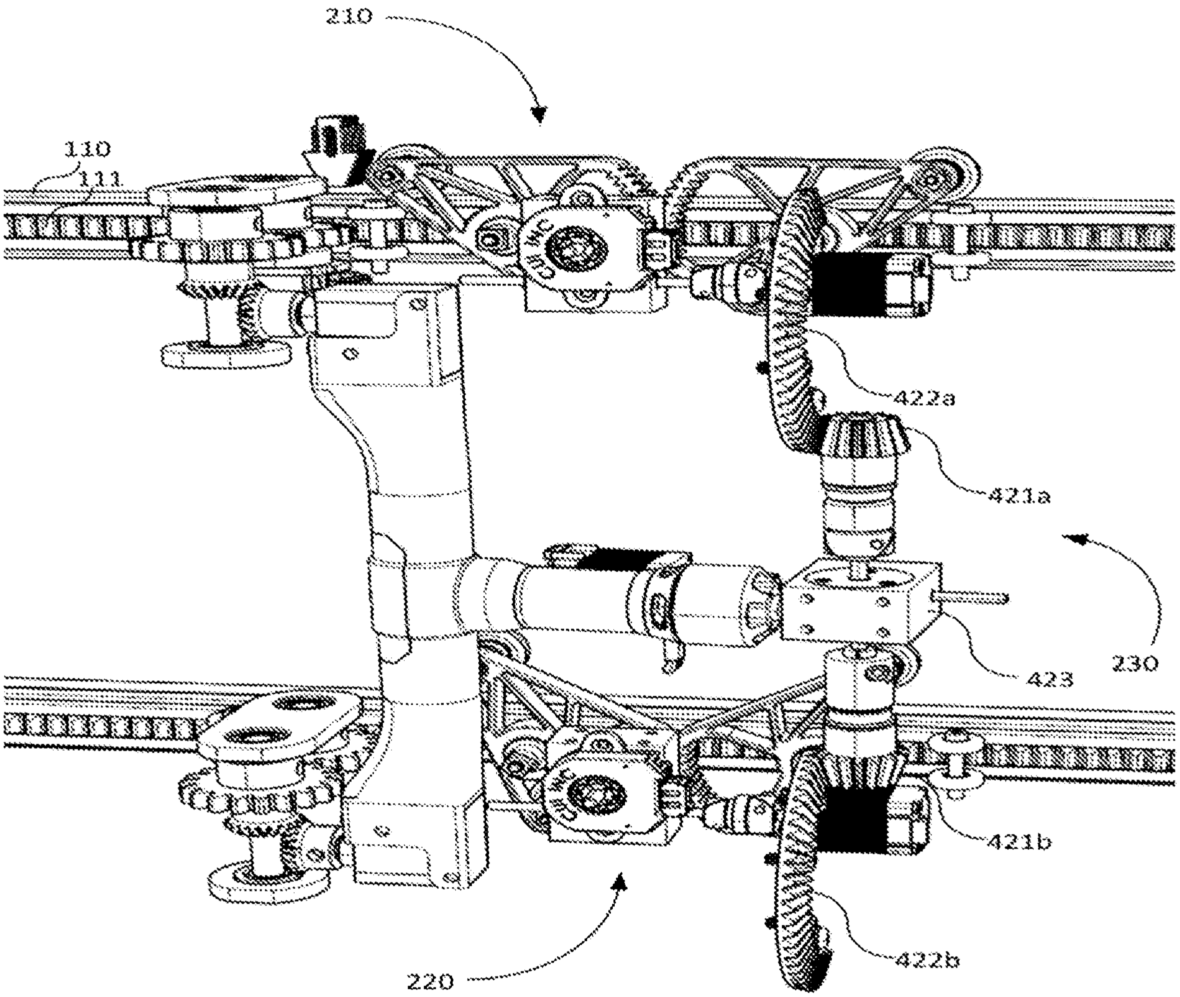
FIG. 16 shows schematically a specific example of a transfer mechanism.

FIG. 16 shows the transfer mechanism 230 of this specific example. The transfer mechanism comprises two rack-and-pinion arrangements, each comprising a pinion 421*a*, 421*b* (bevel gears) arranged to engage with a rack 422*a*, 422*b* having a curved profile around the x-axis. The pinions 421*a*, 421*b* are drivable by a transfer motor 423. When, for example, the first pinion 421*a* is driven, the first pinion 421*a* will rotate to move along the length of the curved rack 422*a*, thereby acting to rotate the first foot arrangement 210 relative to the main body of the robot 200. If the first foot arrangement 210 is engaged with a rail, this will cause the robot 200 to move in the manner described above in relation to FIG. 4. If the first foot arrangement 210 is not engaged with a rail, this will cause the first foot arrangement 210 to rotate. The second pinion 421*b* and second rack 422*b* operate in a similar manner.

It will be appreciated that the examples described herein are to be understood as illustrative examples of embodiments of the invention. Further examples are given below.

The term "control module" may be used generally to refer to a module for controlling the robot 200 or robots of the storage library system 100. Such a control module maybe implemented, as noted earlier, at the controller 250 of the robot 200, at the central control system 130, or using any combination of the these. The control module may be configured to control the robot 200 to perform a transfer action by: controlling the gripping mechanism of one or more of the foot arrangements to disengage the one or more foot arrangements from the second rail; controlling the transfer mechanism to move the robot, while the first one or more of the foot arrangements remains engaged with the first of the rails, from the first position to the second position; and controlling the gripping mechanism of one or more of the foot arrangements to engage one or more of the foot arrangements with the third rail.

The foot arrangement which engages with the new rail may or may not be the same foot arrangement which disengaged from the old rail. Hence, the transfer mechanism may be constructed and arranged to move the robot, while a first foot arrangement remains engaged with a first of the rails, from a first position in which a second foot arrangement is in abutment with a second of the rails to a second position in which the second foot arrangements is in abutment with a third of the rails.

In an example, the storage library system comprises at least one localization feature for allowing the robot to determine its location in the storage library system. Example localization features include: an RFID tag located on at least one of the rails; an optical marking located on at least one of the rails. The robot may comprise a sensing system for detecting the localization feature to determine the robots' location in the storage library system. Examples of optical markings include barcodes, QR codes, and optical, magnetic or capacitive linear codes (e.g. Gray codes).

Moving the robot (by the transfer mechanism) from the first position to the second position may include one or more of: rotating the robot, about the first one or more foot arrangements, out of the plane of the rails; rotating the robot, about the first one or more foot arrangements, in the plane of the rails; and translating the robot in the plane of the rails.

In some examples, the end-effector may be arranged to interact with items on more than one side of the robot. This is advantageous in particular for examples in which the transfer action performed by the robot 200 involves the orientation of the robot 200 changing with respect to the slots 120. This can be achieved using a single end-effector which can move to access different sides of the robot 200, or using a plurality of end-effectors each arranged to operate relative to a different side of the robot 200 (e.g. one per "face"). For example, in the example of FIG. 4, the robot 200 "flips" and therefore it would be preferable for the end-effector to be able to interact with items on either side of the robot 200. As another example, in the example of FIG. 7, the robot 200 rotates 90 degrees per transfer action, presenting a different side of the robot 200 to the slots 120 and therefore it would be preferable for the end-effector to be able to interact with items on all four sides of the robot 200.

The end-effector may be, for example, at least one of a grabber; a reader; a writer; a camera; a maintenance apparatus; and a cleaning apparatus. The robot may comprise two or more end-effectors of the same or different types. It may be preferably to only activate the end-effector when the robot 200 is engaged with two or more rails, although this is not strictly necessary. That is, it is not excluded that the robot 200 might be able to access the slots 120 even when only engaged with a single rail (e.g. using a single foot arrangement).

At least some of the items stored in the storage library system may be physical storage media, and the storage library system may comprise at least one drive for reading and/or writing the physical storage media. The drive(s) may be separate from the robot(s), or the robot(s) may comprise one or more drive(s).

There may be two or more robots in the storage library system (i.e. two, three, four, five, etc.). In examples, there may be tens or even hundreds of robots. The robots may all be substantially identical or not, e.g. some of the robots may have different types of end-effectors In an example, the storage library system comprises a central control system for controlling the robot(s). In other examples, the robots may communicate with each other directly to cooperate.

In examples, the drive mechanism may be located in one of the foot arrangements. In such cases, the drive mechanism may be activatable while only the foot arrangement of the drive mechanism is engaged with a rail.

In examples, the slots are arranged in at least two different planes, and wherein the third rail to which the transfer mechanism moves the first foot arrangement is not located in the same plane as the first and second rail. This includes examples in which the slots are arranged in at least two panels occupying different planes (e.g. FIG. 10*a*). The robot may be able to transfer from one panel to another using the transfer mechanism, e.g. by engaging with a rail of an adjacent panel, or by traversing one or more intermediate rails. This also includes examples in which the slots are arranged in a single, "snaking", panel (e.g. FIG. 10*b*) and the robot is able to transfer from a first portion of the panel occupying a first plane so a second portion of the panel occupying a second, different plane from the first plane.

Described herein is a method of controlling a robot of a storage library system comprising a plurality of slots for storing items, a plurality of rails, the robot comprising: an end-effector for interacting with the items in the slots; at least two foot arrangements and a drive mechanism for moving the robot along the rails; the method comprising causing the robot to perform a transfer action by: controlling a gripping mechanism to disengage a first one or more of the foot arrangements from a first rail; controlling a transfer mechanism to move the robot, while a first one or more of the foot arrangements remains engaged with a first of the rails, from a first position in which one or more of the foot arrangements is in abutment with a second of the rails to a second position in which one or more of the foot arrangements is in abutment with a third of the rails; and controlling a gripping mechanism to engage the one or more of the foot arrangements with the third rail.

Generally, there is provided a robot for use in a storage library system comprising a plurality of slots for storing items and a plurality of rails. The robot comprises an end-effector for interacting with the items in the slots; at least two foot arrangements each having a respective gripping mechanism for releasably engaging the foot arrangement with one of the rails; a drive mechanism for moving the robot along the rails; and a transfer mechanism constructed and arranged to move the robot, while a first one or more of the foot arrangements remains engaged with a first of the rails, from a first position in which one or more of the foot arrangements is in abutment with a second of the rails to a second position in which one or more of the foot arrangements is in abutment with a third of the rails.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A storage library system comprising:
- a first rail, a second rail, and a third rail positioned parallel to each other; and
- a robot, the robot comprising:
- an end-effector structured to interact with an item positioned in a slot of a plurality of slots;
- a first foot arrangement and a second foot arrangement each having a gripping mechanism structured to releasably engage one of the first rail, second rail, or third rail;
- a drive mechanism structured to move the robot along the rails; and
- a transfer mechanism structured to move the robot from a first position to a second position, wherein the second foot arrangement remains engaged with the second rail while the first foot arrangement disengages from the first rail in the first position and engages the third rail in the second position.

2. The storage library system of claim 1, comprising at least one localization feature for allowing the robot to determine its location in the storage library system.

3. The storage library system of claim 2, wherein the at least one localization feature comprises one or more of: an RFID tag located on at least one of the rails and readable by a sensing system of the robot; and an optical marking located on at least one of the rails and readable by a sensing system of the robot.

4. The storage library system of claim 1, wherein the transfer mechanism is constructed and arranged to move the robot from the first position to the second position by rotating the robot about the second foot arrangements.

5. The storage library system of claim 1, further comprising a fourth rail, the fourth rail being parallel to the third rail, wherein the transfer mechanism is structured to move the robot from the second position to a third position by rotating the robot about the first foot arrangement, wherein the second foot arrangement disengages from the second rail and engages the fourth rail.

6. The storage library system of claim 1, wherein the transfer mechanism is structured to move the robot from the first position to the second position by translating the robot while the robot remains in a plane of the rails.

7. The storage library system of claim 1, wherein the first foot arrangement and the second foot arrangement of the robot are located on an end of a respective leg arrangement of the robot, and wherein the transfer mechanism is structured to move the robot from the first position to the second position by moving the respective leg arrangement.

8. The storage library system of claim 1, wherein the item is a physical storage medium, and the storage library system comprises at least one drive for reading and/or writing the physical storage medium.

9. The storage library system of claim 1, wherein the end-effector is arranged to interact with items on either side of the robot.

10. The storage library system of claim 9, wherein the end-effector comprises at least one of a grabber; a reader; a writer; a camera; a maintenance apparatus; and a cleaning apparatus.

11. The storage library system of claim 1, comprising two or more robots.

12. The storage library system of claim 1, wherein the drive mechanism is activatable while only one of the first foot arrangement or the second foot arrangement is engaged with a rail.

13. The storage library system of claim 1, wherein the slots are arranged in at least two different planes, and wherein the third rail to which the transfer mechanism moves the first foot arrangement is not located in the same plane as the first and second rail.

14. The storage library system of claim 1, comprising a control module configured to control the robot to perform a transfer action by:
- controlling the gripping mechanism of the first foot arrangement to disengage the first foot arrangement from the first rail;
- controlling the transfer mechanism to move the robot, while the second foot arrangement remains engaged with the second rail, from the first position to the second position; and
- controlling the gripping mechanism of the first foot arrangement to engage the third rail.

15. A computer program for controlling a robot of a storage library system, the storage library system comprising a plurality of slots for storing items and a first, a second and third rail positioned parallel to each other, the robot comprising:
- an end-effector structured to interact with the items in the plurality of slots; and
- a first foot arrangement, a second foot arrangement, and a drive mechanism for moving the robot along the first rail, the second rail, or the third rail;
- wherein the computer program comprises instructions configured to, when executed by a processing unit, cause the robot to perform a transfer action including:
  - controlling a gripping mechanism to disengage the first foot arrangement from the first rail;
  - controlling a transfer mechanism to move the robot, while the second foot arrangement remains engaged with the second rail, from a first position; and
- controlling a gripping mechanism to engage the first foot arrangement with the third rail at the second position.

16. The storage library system of claim 1, wherein the slots are positioned between the first rail and the second rail, and between the second rail and the third rail.

17. The computer program of claim 15, wherein the plurality of slots is positioned between the first rail and the second rail, and between the second rail and the third rail.

18. The computer program of claim 15, wherein the transfer mechanism is structured to move the robot from the first position to the second position by rotating the robot about the second foot arrangement.

19. The computer program of claim 15, wherein the first rail and the second rail are in a first plane, the third rail is in a second plane, and the first plane is different from the second plane.

20. The computer program of claim 15, wherein the first foot arrangement and the second foot arrangement are located on an end of a respective leg arrangement of the robot, and wherein the instructions further cause the robot to perform a transfer action including controlling the transfer mechanism to move the robot from the first position to the second position by moving the respective leg arrangement.

* * * * *